(12) United States Patent
Ishikawa et al.

(10) Patent No.: US 6,339,424 B1
(45) Date of Patent: Jan. 15, 2002

(54) DRAWING PROCESSOR (75) Inventors: Hiroshi Ishikawa; Tetsuro Kawata, both of Nakai-machi (JP)

(73) Assignee: Fuji Xerox Co., LTD, Tokyo (JP)

( * ) Notice: Subject to any disclaimer, the term of this patent is extended or adjusted under 35 U.S.C. 154(b) by 0 days.

(21) Appl. No.: 09/191,541

(22) Filed: Nov. 13, 1998

(30) Foreign Application Priority Data

Nov. 18, 1997 (JP) .............................................. 9-317334

(51) Int. Cl.<sup>7</sup> ................................................ G06F 15/00
(52) U.S. Cl. ...................................................... 345/419
(58) Field of Search ................................. 345/418, 419, 345/619, 620, 667, 668

(56) References Cited

U.S. PATENT DOCUMENTS 4,775,946 A * 10/1988 Anjyo ......................... 364/522

FOREIGN PATENT DOCUMENTS

JP  A-6-13115   5/1994
JP  A-6-282432  10/1994

* cited by examiner

*Primary Examiner*—Phu K. Nguyen
(74) *Attorney, Agent, or Firm*—Oliff & Berridge, PLC (57) ABSTRACT

The integrated drawing processor handles the image data that cannot be processed at a required rate by transferring the image data to a non-real-time path unit from an operation processor through an operation processor interface, where the data is processed. Thereafter, the data is transferred through the operation processor interface to the address of a designated storage unit. The transferred data is processed by the operation processor interface necessary, or repeatedly processed by the non-real-time path unit, or transferred to the real-time path unit, and fmally transferred to an output device. The image data that can be processed at the required rate is transferred directly to the real-time path unit through the operation processor interface. The image data transferred to the real-time path unit is outputted to the output device through an output device interface. The drawing processor makes it possible to perform the essential function of the image processing and the auxiliary accelerating function with hardware of a small circuit scale.

11 Claims, 9 Drawing Sheets

| HEADER NUMBER | CONTENT OF REAL-TIME PATH HEADER | CONTENT OF NON-REAL-TIME PATH HEADER |
|---|---|---|
| HEADER 1 | 01 | 02 |
| HEADER 2 | ID NUMBER | ID NUMBER |
| HEADER 3 | PARAMETER | PROCESSING PARAMETER |
| HEADER 4 | | IMAGE SIZE |
| HEADER 5 | | TRANSFER RATE |
| HEADER 6 | | MEMORY ADDRESS |

| OID | Number Of Trapezoid (5) | Bbox | PID | Color | Trapezoid 1 |
|---|---|---|---|---|---|

OID:   Object ID
Bbox:  Circumscribed rectangle
PID:   Processing ID
Color: Color processing

| OID | Number Of Trapezoid (2) | Bbox | PID (picture 1) |
|---|---|---|---|

| Trapezoid 1 | RH1 | RD1 | -------- |
|---|---|---|---|

OID: Object ID
Bbox: Circumscribed rectangle
PID: Processing ID
RH: Image header
RD: Image data

DRAWING PROCESSOR

BACKGROUND OF THE INVENTION

1. Field of the Invention

The present invention relates to a drawing processor to process, display, and output image data generated by a computer.

2. Description of the Related Art

When image data generated by a computer is processed to be displayed on a screen or outputted to a printer, since the processing of color image data specially takes a long time, devices to accelerate the processing have been added in the conventional technique. The devices perform functions such as a compression expansion processing to make a color image compact, rotation and enlargement processing for edition, vector operation to calculate coordinate values, color compensation to enhance picture quality, and filtering. These additional devices are generally called the hardware accelerators. Use of these hardware accelerators will achieve a higher rate in processing than in processing by use of the operation processor of a computer with software. The disadvantage of the hardware accelerators lies in that all the functions desired to be accelerated have to be prepared by hardware. Though it depends on the number of functions to support, basically the circuit size becomes greater. In the case of a printer, for example, the foregoing hardware accelerators become necessary in addition to other than the hardware to implement essential processing functions such as interpretation of the page description language (PDL) file, expansion of images, and operation of the printer as well as monitoring of the normal end.

In regard to this, the Japanese Published Unexamined Patent Application No. Hei 06-131155 proposes a device, in which programmable logic is used in an address generator block and an operation block, and modified data of various image processing are stored as a file, thereby common programmable logic is modified to comply with various image processing.

Further, the Japanese Published Unexamined Patent Application No. Hei 06-282432 proposes a device, in which data flows as to combinations of operation circuits for various processing corresponding to various processing are controlled, and thereby various processing is executed with less combinations of operations, which reduces the scale of operation circuits.

However, these conventional methods involve many restrictions in performing image processing, and they cannot sufficiently utilize the circuit scale. The processing method that resisters macro processing groups necessary for specific image processing in the operation processor, temporarily decodes instruction codes inputted from outside, generates addresses, and selects operations, is effective when the processing consists of sets of simple processing. However, the method is not effective in implementing complicated and various types of processing. Installation of a plurality of arithmetic logic units (ALU) to implement parallel processing effects an improvement. However, the serial processing is suited to the pipeline processing in the image processing, and the parallel processing exhibits a higher rate than versatile programs, and yet the hardware accelerators do not demonstrate a sufficient effect for its scale.

And, these techniques support a part of the image processing other than the essential processing, which however does not make the device compact as a whole.

SUMMARY OF THE INVENTION

The present invention has been made in view of the foregoing problems of the conventional techniques, and an object of the invention is to provide a construction whereby both the essential function of the image processing and the accelerator function to exceptionally accelerate processing of a heavy load can be implemented by hardware, and the hardware can be made up on a small circuit scale.

In order to accomplish the foregoing object, the drawing processor according to the invention is formed of hardware, and it is provided with a real-time path unit that processes synchronously with the image processing rate of the output device, a non-real-time path unit that processes at a lower rate than the synchronized rate, and a path determination unit that determines whether the inputted image data is transferred to the real-time path unit or to the non-real-time path unit, on the basis of the content of the inputted image data. And the drawing processor is constructed such that the non-real-time path unit at least contains rewritable hardware that reconfigures processing functions.

In this construction, since the non-real time processing is implemented by the reconfigurable hardware, the same hardware is able to execute various kinds of non-real time processing, whereby the circuit scale can be kept small. Further, high-speed processing becomes possible compared to the processing executed with software.

The present invention will further be described in detail. One example of the system that is implemented by the present invention is comprised of an operation processor, an integrated drawing processor, and an output device as a whole. The integrated drawing processor is composed of an operation processor interface (I/F), a real-time path unit, a non-real-time path unit, and an output device I/F. The operation processor I/F is formed of an input buffer and a path determination unit. The non-real-time path unit is composed of a reconfiguration data control unit, reconfigurable hardware, a work memory, and an output buffer. Attached to the data transferred from the operation processor is header information as to the designation of the real-time path unit or the non-real-time path unit, and the parameters. And, if an ID number is attached to the header, the reconfiguration data control unit loads processing logic into the reconfigurable hardware to bring it into function based on the ID number. A path switch switches the path, whereby the reconfigurable hardware sitting in the non-real-time path unit can also be used in the real time path.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DESCRIPTION OF THE PREFERRED EMBODIMENT

Preferred embodiments of the present invention will hereafter be described in detail with reference to the accompanying drawings.

Figure 1:
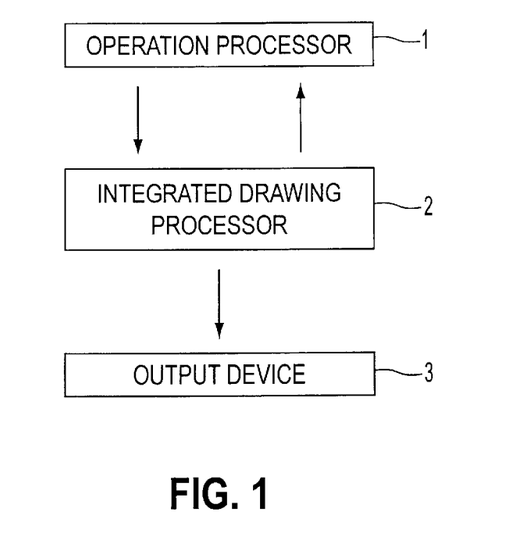
FIG. 1 is a block diagram to illustrate a construction of the entire system relating to an embodiment of the present invention.

FIG. 1 illustrates a construction of the system that employs an integrated drawing processor relating to the present invention. In FIG. 1, an operation processor 1 such as a computer generates a document written by a PDL such as the PostScript (trademark of US Adobe Systems Co., Ltd. In the U.S.), and a format for display of the GDI (Graphic Device Interface, trademark of Microsoft Corp. in the U.S.) by using application software. And the operation processor 1 may receive through a network a file that was made in advance by another computer, and may visualize this file (electronic information). An integrated drawing processor 2 contains the operational environment for hardware and software necessary for processing of visualization. The operation processor 1 converts the file by using the integrated drawing processor 2 into a bitmap data that can be outputted to an output device 3 such as a display, a printer, or the like. The integrated drawing processor 2 is directly connected to the output device 3, and drives the output device 3.

Figure 2:
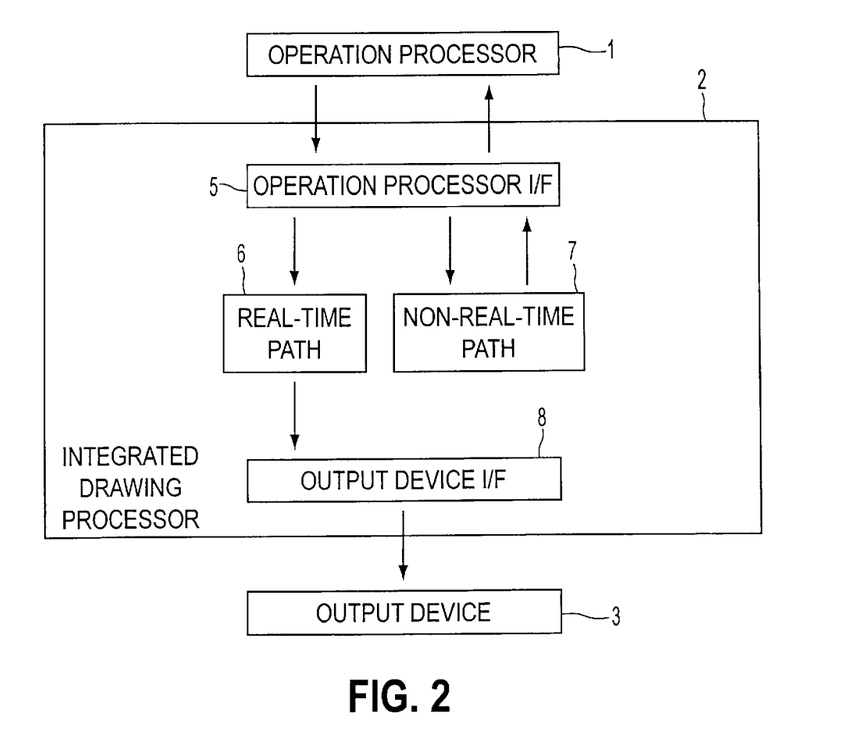
FIG. 2 is a block diagram to illustrate the inner part of an integrated drawing processor.

FIG. 2 illustrates a construction of the integrated drawing processor 2. As shown in FIG. 2, the integrated drawing processor 2 is composed of an operation processor interface (I/F) 5, an output device interface (I/F) 8, a real-time path unit 6, and a non-real-time path unit 7. The operation processor I/F 5 is to connect the integrated drawing processor 2 to the operation processor 1 in regard to the hardware or the software. The output device interface I/F 8 connects the integrated drawing processor 2 to the output device 3. The real-time path unit 6 processes image data received from the operation processor 1 at a rate required by the output device 3, or at a rate required for visualizing the image data. The non-real-time path unit 7 executes the processing at a lower rate than the required rate. The image data transferred to the non-real-time path unit 7 from the operation processor 1 through the operation processor I/F 5 is processed in the non-real-time path unit 7, and thereafter, transferred to the designated address of a storage unit through the operation processor I/F 5. The transferred data is further processed by the operation processor 1 if necessary, or repeatedly processed by the non-real-time path unit 7, or transferred to the real-time path unit 6, and is finally sent to the output device 3. The image data transferred to the real-time path unit 6 from the operation processor 1 through the operation processor I/F 5 is outputted through the output device I/F 8. The image data identified in advance to be processed at the required rate is transferred to the real-time path unit 6. The result processed by the real-time path unit 6 is transferred to the output device 3 through the output device I/F 8. Here, the output device 3 indicates a printer or a display unit. The printer includes a black-and-white printer and a color printer, and the color printer includes, for example, a cascade type and a tandem type. The display unit includes, for example, a CRT and a liquid crystal display unit.

Although the image data transferred from the operation processor 1 is considered as two-dimensional static images in the description of the following embodiment, basically the same flow can be applied to three-dimensional static images and animation (time-varying images), and these images can be treated as the same processing object.

Figure 3:
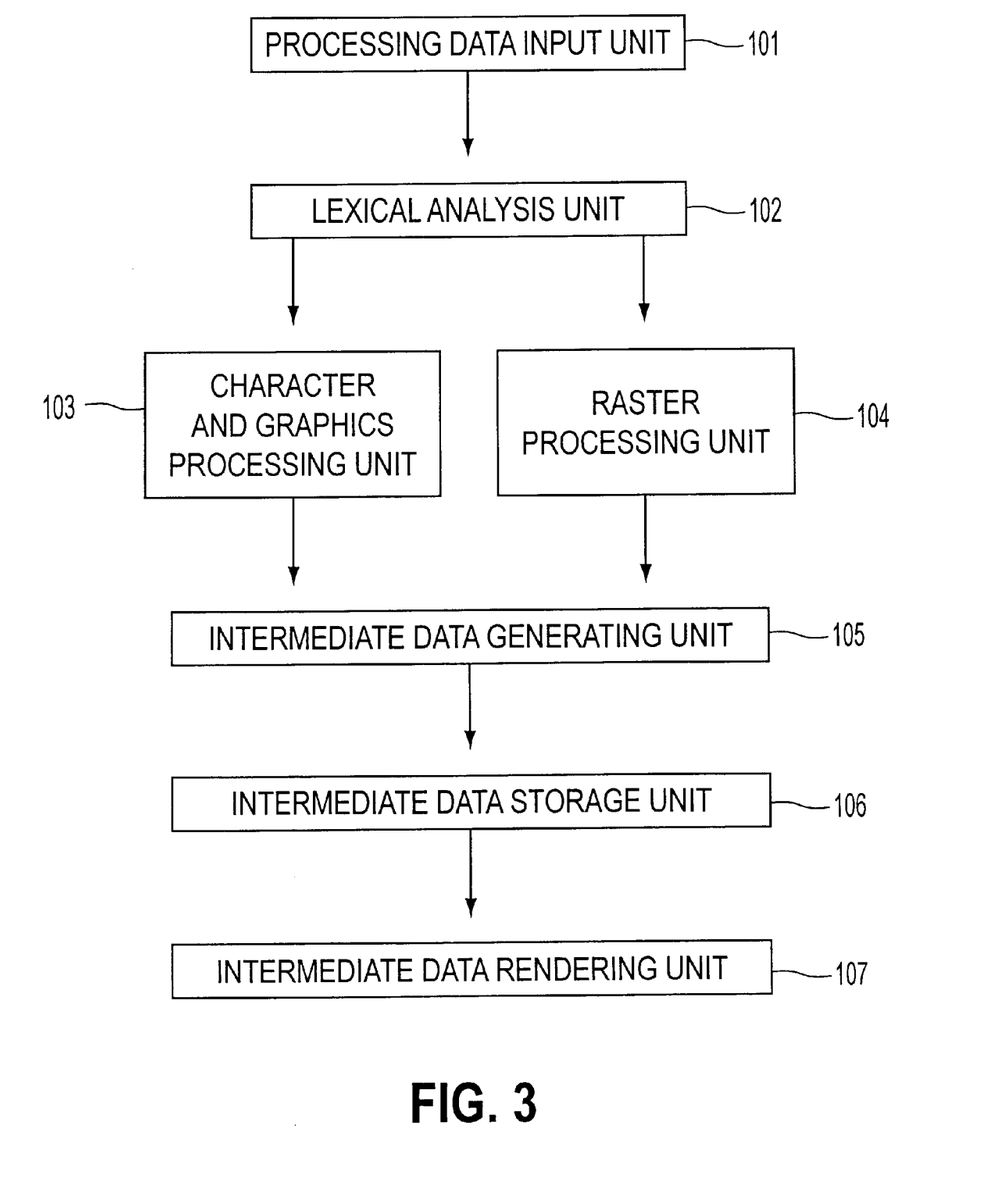
FIG. 3 is a flow chart to explain the data processing.

FIG. 3 illustrates a processing flow of each function unit in the system in FIG. 1 and the image data. As a preprocessing of the processing flow in FIG. 3, data desired to be printed or displayed is generated by application software. It is made by the PDL, GDI type, or PDF (Portable Document Format). The data to be processed are inputted to the operation processor 1 directly or through a network.

In FIG. 3, first, a processing data input unit 101 temporarily stores a data file into a storage unit as a block, and a lexical analysis unit 102 sequentially analyzes the contents written in the file in accordance with the syntax of description to output them in terms of a token, and divides them into objects to apply necessary processing.

If the lexical analysis result indicates a line drawing instruction, the character and graphics processing unit 103 processes the instruction. The line drawing instruction includes character codes, font IDs, coordinate matrix drawing colors and the like in the case of characters, or vectors, coordinate conversion matrixes, line attributes, drawing colors, and the like in the case of graphics, and the character and graphics processing unit 103 carries out such processing. First, the vector data is generated by using drawing instruction groups and information added thereto, and font data information, and then the vector data is converted by a conversion matrix. Since the converted vectors are expressed by the Bezier curve or the like, these are approximated by a plurality of line vectors. The linearly approximated vectors are expressed into rectangular sets of trapezoidal data and the like.

If the lexical analysis result indicates an image drawing instruction, a raster processing unit 104 processes the instruction. The image drawing instruction includes source image data, source image header information (size, depth, color, compression, etc.), coordinate matrixes, etc., and the raster processing unit 104 caries out such processing. The raster processing unit 104 executes operations on the basis of the header information attached to the source image data. The contents of operations include expansion, enlargement, rotation, color compensation, and the like. The result is expressed in rectangular sets in the same manner.

Figure 12:
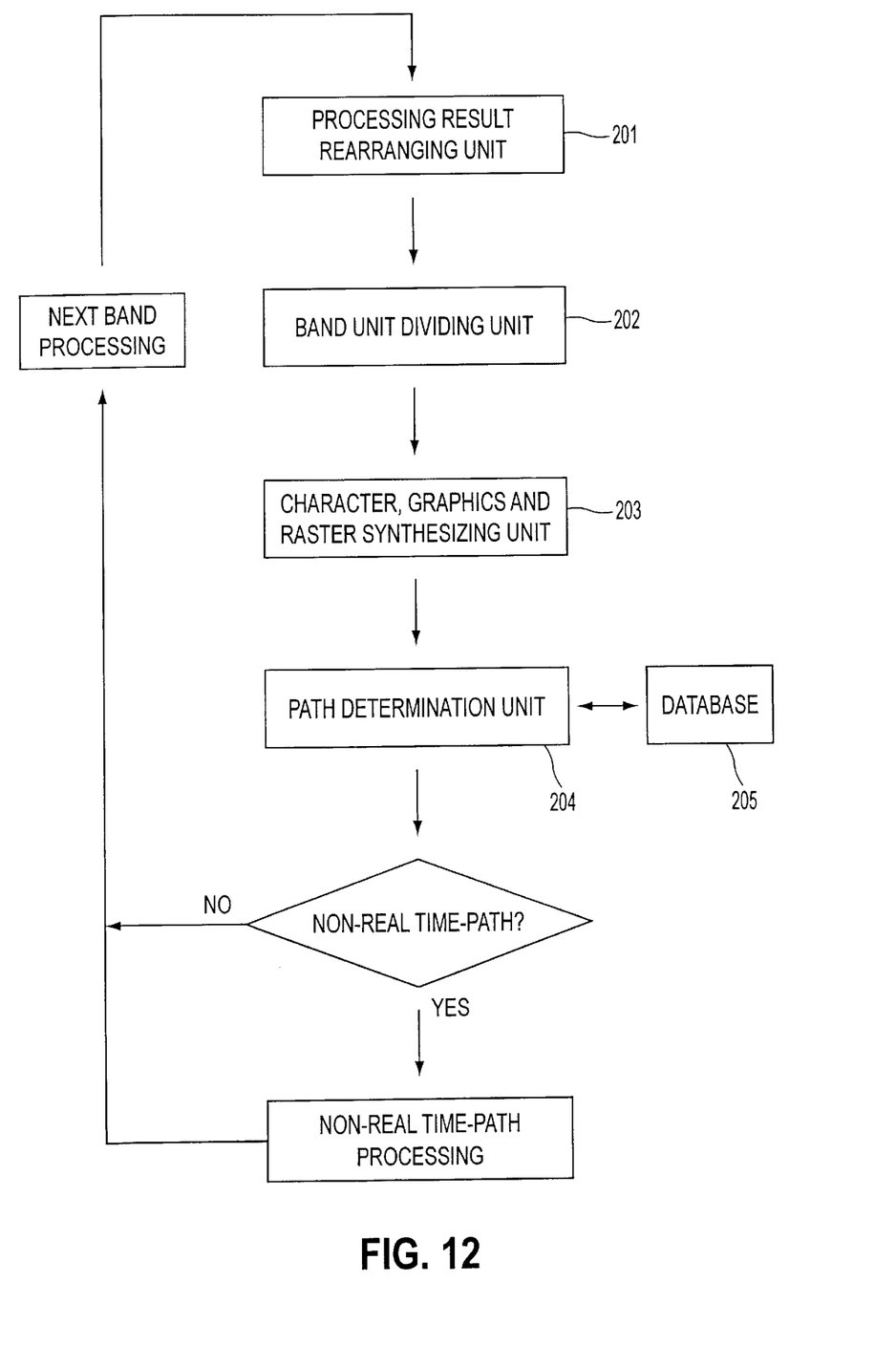
FIG. 12 is a chart to explain a flow to decide a path.

An intermediate data generation unit 105 consists of a processing result rearranging unit 201 (FIG. 12), a band unit dividing unit 202 (FIG. 12), and a character, graphics and raster synthesizing unit 203 (FIG. 12). First, the processing result rearranging unit 201 rearranges drawing instruction groups sequentially processed by the lexical analysis unit 102 by the area unit. The area unit differs depending on the type of the output device 3. If it is a printer, the areas are partitioned by the unit of a specific number of lines along the scanning direction of the print output, and the areas are generated from the leading part being outputted. One example of the area unit is the band unit. In the case of a display unit, in the same manner as the foregoing, the areas are partitioned in accordance with the lines in the operational direction. The character and graphics and raster images are described to be spread on the display screen or on one page. Consequently, when the data rearranged from the leading part is fit in the areas, graphics or raster images can overlap on the boundaries of the areas. In that case, the band unit dividing unit 202 divides rectangular data into a plurality of areas, and newly generates rectangles to be fit in each of the areas. The processing is executed for each of the character and graphics or the raster images, and the character, graphics and raster synthesizing unit 203 generates intermediate data completed in each area.

Figure 7:
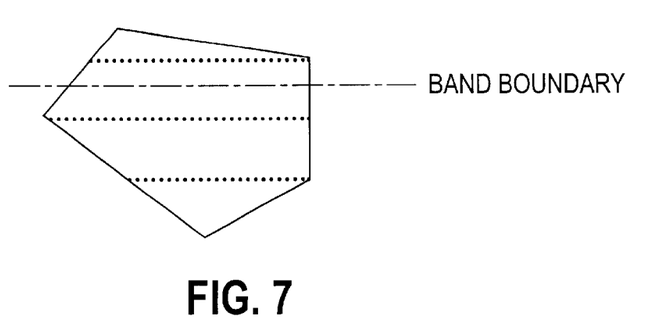
FIG. 7 is a chart to explain the band of character and graphics.
Figure 8:
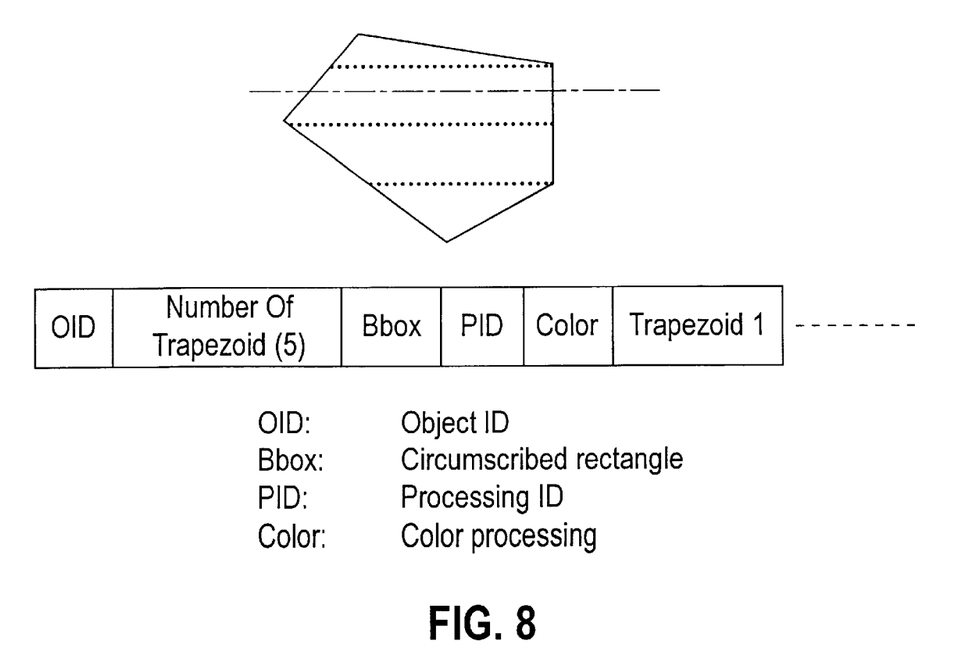
FIG. 8 is a chart to explain the band and the attached information of the character and graphics.

FIG. 7 through FIG. 10 illustrate examples in which the intermediate data is generated. FIG. 7 and FIG. 8 relate to characters and graphics. Certain graphic data is partitioned by the triangles or trapezoids illustrated by the dotted lines. Further, it is partitioned by a band boundary. In the five partitioned areas is generated information to which object IDs, circumscribed rectangles, processing IDs, color processing, etc., are added.

Figure 9:
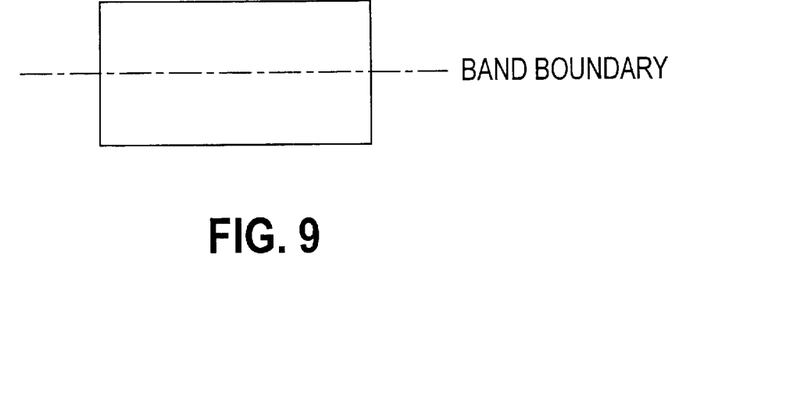
FIG. 9 is a chart to explain the band of a raster.
Figure 10:
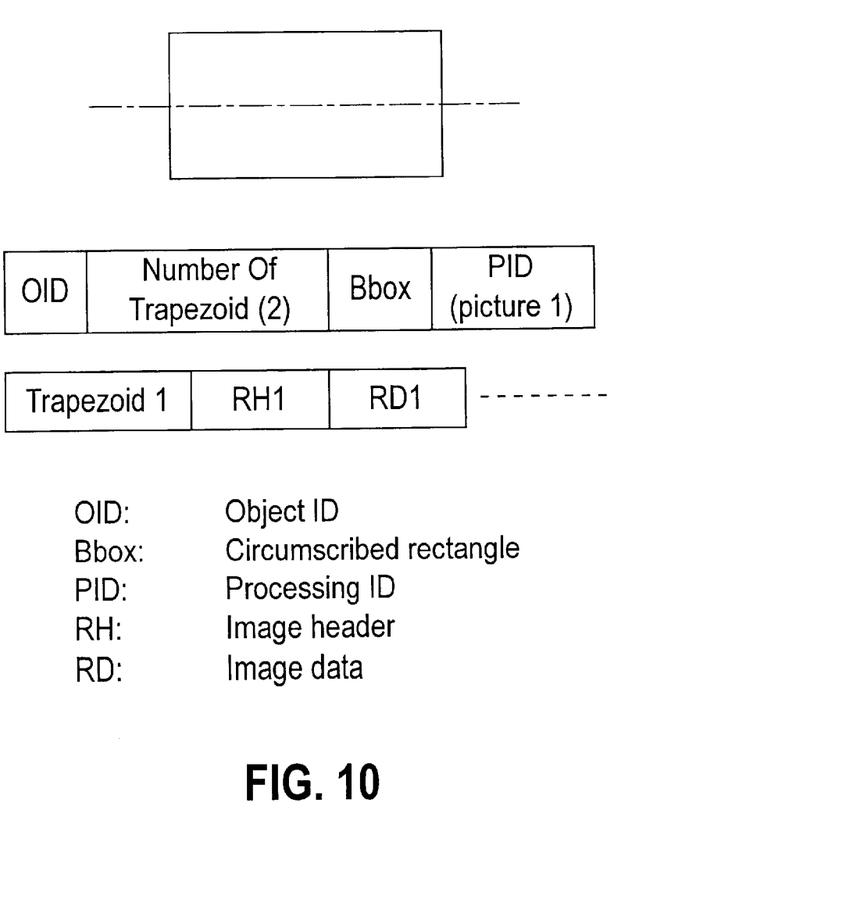
FIG. 10 is a chart to explain the band and attached information of the raster.

FIG. 9 and FIG. 10 relate to the raster processing. Normally, a rectangular photograph is partitioned into two by the band boundary. The image headers and image data of each of the object IDs, the number of trapezoids, circumscribed rectangles, processing IDs, and trapezoids are generated in the same manner as the character and graphics. In this manner, the intermediate data is given the header information to indicate which rendering processing is needed for each of the areas. In regard to the raster, the intermediate data can choose same types of data formats depending on role-sharing with respect to an intermediate data rendering unit 107 for the processing related to the degree of rendering; the residual in which the processing executed by the intermediate data rendering unit 107 is subtracted from the processing required for the final data becomes the processing that the intermediate data generation unit 105 is required to perform. Assuming that necessary rendering processing is color conversion, resolution conversion, and screen, these are given as the header information. The character, graphics and raster synthesizing unit 203 synthesizes by the unit of the common banding the character and graphics and the raster images each individually processed, into the information in FIG. 8 and FIG. 10.

The intermediate data thus generated is stored in an intermediate data storage unit 106, and the intermediate data rendering unit 107 executes the rendering processing of the data. The rendering processing of the character and graphics data is the line vector drawing of rectangles. In this processing, the edge coordinates of a rectangle are calculated, rectangle data is derived from the two coordinate calculation processes, a line parallel to the x-axis of the rectangle is drawn on the basis of the coordinate values calculated from the rectangle data, and the inside of the rectangle is painted out on the basis of the color information. In regard to the raster data, it is assumed according to the header information that the color conversion and resolution conversion need to be performed. Provided that color space data is inputted by using the RGB, the YMCK corresponding to each of the RGB data are outputted by using a table. If the table becomes large, the YMCK are outputted from a smaller table obtained by an interpolation calculation unit that calculates the outputted representative values and the approximate values thereof. In case the output device 3 is a display unit, the RGB (proper) suited for the device characteristic is calculated and outputted from the RGB (standard), which only needs a simpler calculation than obtaining the YMCK output. If the source image data has a small size and the data needs to enlarge so as to conform to the output device 3, the resolution conversion is carried out. That is, the raster data is read in, addresses are calculated to comply with the condition of pixels of the output device 3 by the interpolation processing. These are processed for each of the divided areas, and the results are outputted to the output device 3.

Though the intermediate data rendering unit 107 can adopt a rendering processing method by software, it can adopt a method that develops to process directly by pipeline processing hardware the coordinate calculation using the DDA (Digital Differential Analyzer) and the intermediate format containing the character and graphics and the raster, which method has already been known.

The processing flow as shown in FIG. 3 is an integrated flow including the real-time path unit 6 and the non-real-time path unit 7. The operation processor 1 performs the processing until the intermediate data is generated. The processing with the raster processing occupying the main-part imposes a heavy load to the operation processor 1. Therefore, if the operation processor 1 simply performs the foregoing processing through software, it will take a long time.

Figure 4:
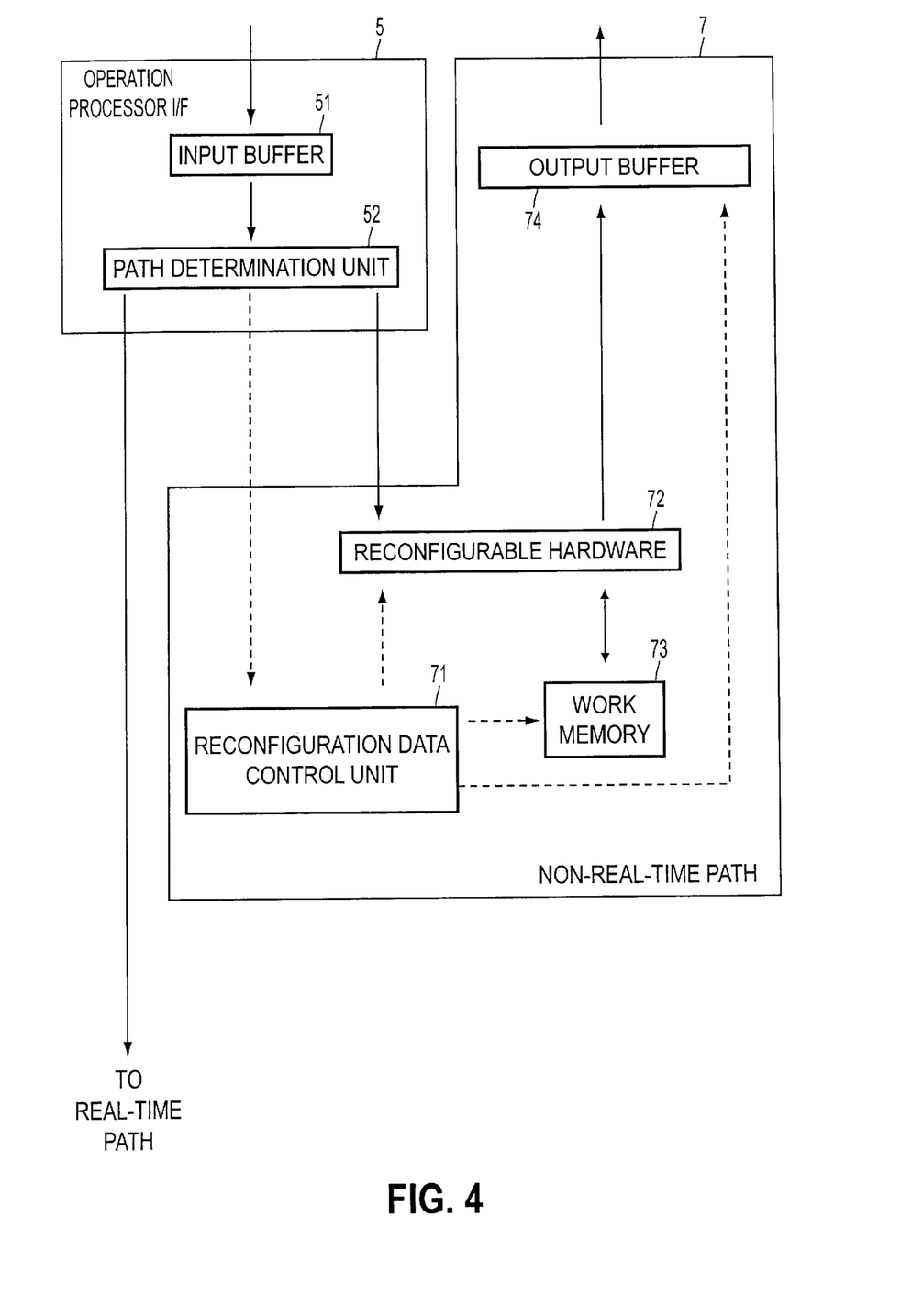
FIG. 4 is a block diagram to illustrate the inner part of a non-real-time path unit.

FIG. 4 is a block diagram to illustrate the processing of the non-real-time path unit 7. In the operation processor 1 are registered in advance the performances of the memory and CPU, the required rate of the output device 3, and the database relating to the integrated drawing processor 2. Using the database, the operation processor 1 determines the processing contents in the case of the image processing for example, and roughly determines whether the image data is to be transferred to the real-time path unit 6 or to the non-real-time path unit 7 from the object image size. If it is difficult for the operation processor 1 to determine whether the real-time path unit 6 can handle or not, the image data is automatically transferred to the non-real-time path unit 7.

In FIG. 4, the operation processor I/F 5 includes an input buffer 51 and a path determination unit 52. The non-real-time path unit 7 includes a reconfiguration data control unit 71, reconfigurable hardware 72, a work memory 73, and an output buffer 74. The image data for which the operation processor 1 determined the path and to which required header information is added is transferred to the operation processor I/F 5. The operation processor I/F 5 stores the image data in the input buffer 51, and the path determination unit 52 determines where to transfer data, namely the transfer destination of the data, on the basis of the identification information of the real time or the non-real time written in the header information. In the case of the data for the non-real-time processing, the data header includes the ID to indicate the content of image processing, the image data size, the transfer rate, the memory address in the operation processor 1, etc. The header information is transferred to the reconfiguration data control unit 71, and the reconfiguration data control unit 71 loads into the reconfigurable hardware 72 the processing content operated next that is written in the header information. The reconfigurable hardware 72 is formed of a dynamically rewritable FPGA (Field Programmable Gate Array), and a part or all of the logic can be rewritten. The input buffer 51 sends the data processed by the non-real-time path unit 7 to the reconfigurable hardware 72. The reconfigurable hardware 72 executes the processing by using the work memory 73 to send the result to the output buffer 74, and the output buffer 74 transfers it to the memory address written in the header.

In the reconfiguration data control unit 71 is stored in advance processing logic with the raster processing occupying the main part. It is described that the processing logic is loaded into the reconfigurable hardware 72, and then it implements the similar function to the general ASIC (Application Specific IC). In the reconfigurable hardware 72, in the same manner as the general ASIC, the operation logic is described by a hardware description language such as the HDL, compiled and converted into logic data for the hardware, and checked by operating simulation as to whether it operates at the timing exactly as expected. The maximum size of the reconfigurable hardware 72 is also considered. If the description of the operation logic exceeds the maximum gate size, the hardware description is made compact to end up within the maximum size even though the operating rate is reduced. The logic data normally operated is registered in the reconfiguration data control unit 71. One method of registering the logic data is to input it into the operation processor 1 which is a computer and to transfer it through the operation processor I/F 5. Or, another method is to install a ROM or the like where the data is stored in advance in the reconfiguration data control unit 71. If a flash memory is used instead of the ROM, the data can be downloaded from the operation processor 1 after it is installed.

Figure 11:
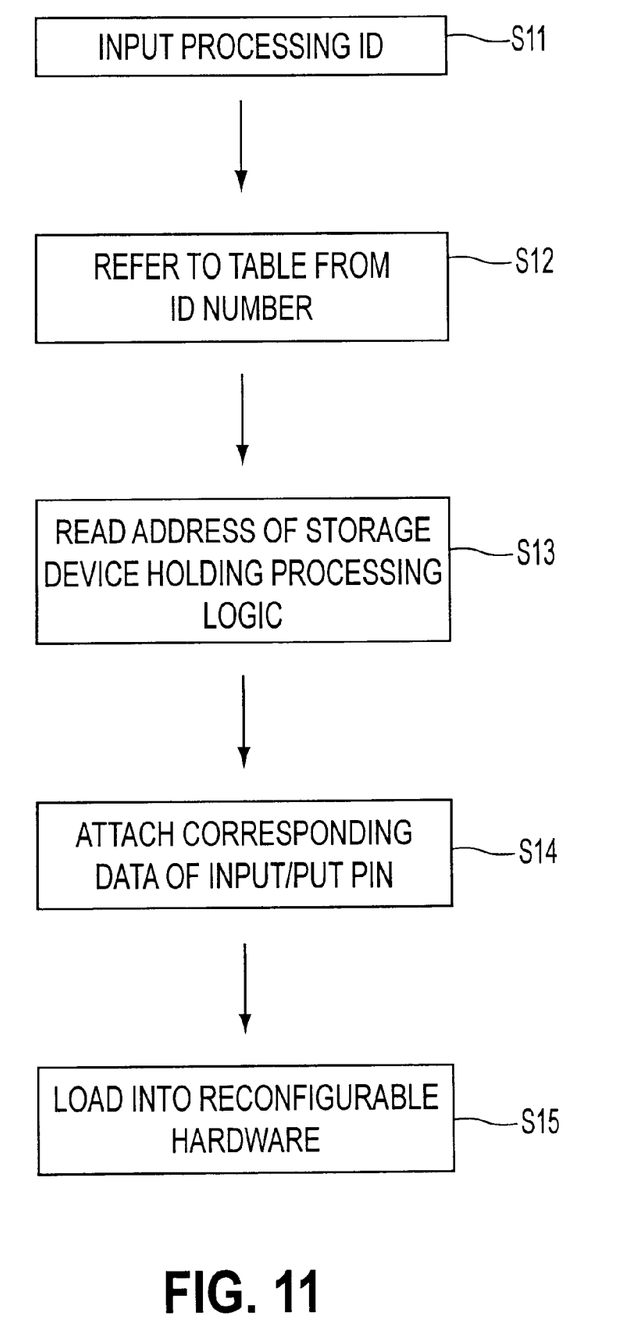
FIG. 11 is a chart to explain a flow to decide processing logic.

FIG. 11 illustrates the procedure to write in the reconfigurable hardware 72. As shown in FIG. 11, when the processing ID is inputted, the table in the reconfiguration data control unit 71 is referred to (S11, S12). The ID number and the table number is arranged so as to coincide with each other. The table referred from the ID number has address information written therein. The processing logic stored in the reconfiguration data control unit 71 is read out from the address information (S13). The required corresponding data allocated to input/output relating to other functions than the processing is read out (S14), and the processing system and input/output system are combined to be loaded into the reconfigurable hardware 72 (S15).

Figure 5:
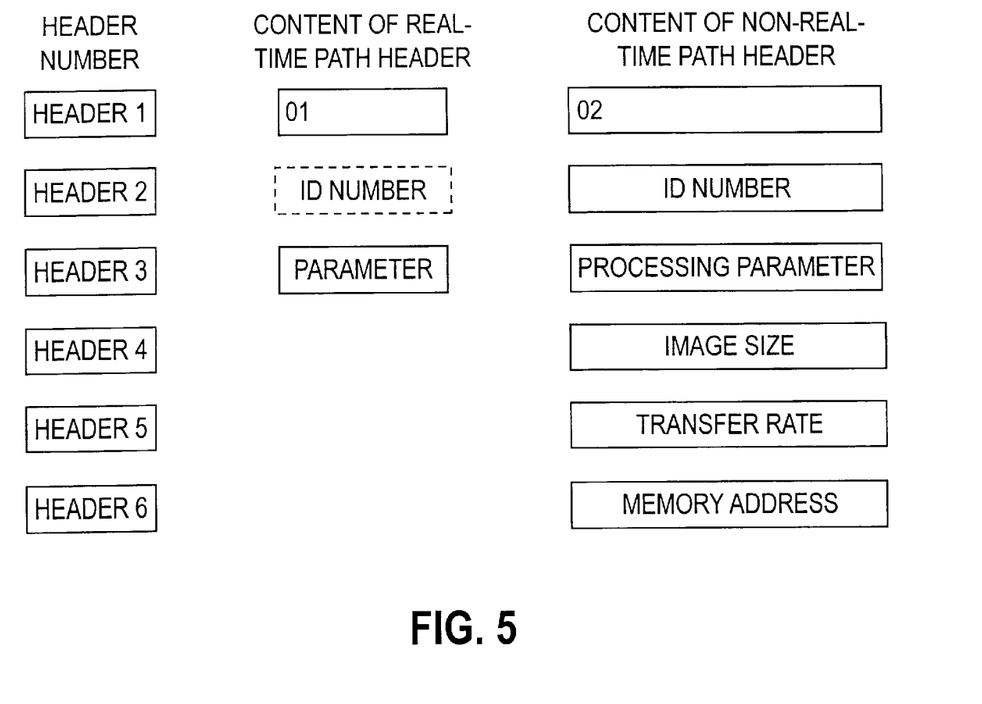
FIG. 5 is a block diagram to illustrate header information.

FIG. 5 illustrates an example of the header information. The header information is information whereby the path determination unit 52 selects the non-real-time path or the real-time path. In the figure, the real-time path unit is indicated by the code 01, and the non-real-time path unit is indicated by the code 02. In the real-time path header, parameters required for the subsequent processing are attached. If an image is enlarged to its double size, for example, the parameters include numeric characters indicating the enlargement processing name and scale factor 2. In the non-real-time path header, ID numbers indicating how the transferred data is desired to be processed are attached. The processing parameter includes an operation factor when the color compensation is executed. The processing parameter is followed by the image size, transfer rate, and memory address.

If the operation processor 1 uses the non-real-time path unit 7, the operation processor 1 attaches the header information to the data to be processed. The operation processor I/F 5 temporarily stores the received data in the input buffer 51. Since the content of the header 1 indicates the non-real-time path, the path determination unit 52 transfers the data to the non-real-time path unit 7. The header information is transferred to the reconfiguration data control unit 71, and this control unit 71 loads the processing logic into the reconfigurable hardware 72 dynamically in correspondence with the data sequentially transferred thereto. The reconfigurable hardware 72 thus loaded receives the data to be processed via the path determination unit 52, sequentially processes the data by using the work memory 73, and transfers it to the output buffer 74. The reconfiguration data control unit 71 determines a usable area in the work memory 73 in accordance with the content of processing. Since the destination address to which the output buffer 74 sends the data is attached to the received header information, the control unit 71 transfers the header information to the output buffer 74. The output buffer 74 transfers the data on the basis of the destination address information.

The color compensation processing will be described with a series of flows, using the color compensation processing as an example. The contents of the color processing include more than ten types of combinations consisting of the output device 3 and the description system, the processing quality, and the like. The description system includes the RGB system, Lab system, YMCK system as for the input; and the RGB system and YMCK system as for the output. It also includes the table system, the matrix system, and the table and compensation system, depending on the conversion accuracy. The relevance processing to the output device 3 includes the color space range mapping processing of the output device 3. The processing logic of a combined processing module is entirely stored in the reconfiguration data control unit 71. If it is not stored, it can be downloaded from the operation processor 1 through the operation processor I/F 5. Each of the processing logic has an ID number attached, which is in one-to-one correspondence with the ID number of the inputted header. If the ID number indicates the table and compensation system, the processing logic for the table and compensation system is loaded. The hardware logic of about 50 k gates for the table and compensation system is written in the reconfigurable hardware 72. The reconfigurable hardware 72 is assumed that 100 k gates can be written therein. If necessary, a greater size can be mounted. The parameters required for the operations are obtained from the header information to be set in the reconfigurable hardware 72. The reconfigurable hardware 72 is integrated with a high-speed memory element SRAM, which configures the coefficients and reference tables that are needed for operations. The processing data is inputted by the RGB (standard), one of the standard expressions used for files on the Internet, temporarily stored in the work memory 73 by a unit of more than several pixels, read out at each operation, and processed by the reconfigurable hardware 72; and thereby the YMCK data is generated. Here, one pixel is formed of 24 bits on input and 32 bits on output, however, this value is determined by the range that the output device 3 can express. The YMCK data is sent to the output buffer 74 by a unit of 32 bits, and the output buffer 74 transfers the YMCK data to the designated address. The reconfigurable hardware 72 and the work memory 73 operate synchronously with the clock of a specific constant rate to function at high speed. The work memory 73 can employ a dynamic RAM, and adopt a memory capable of high-speed access or a memory capable of spreading the bus width for connection. The address designated for the transfer is the memory in the operation processor 1.

The reconfigurable hardware 72 operates with the clock frequency of 100 MHz, although it depends on the characteristic of the element. Assuming that the table and compensation processing are completed with 5 clocks per one pixel, the processing speed is 20 M pixels/sec. In the case of transferring data to the output device 3 in real time, for example, the processing speed of 50 M pixels/sec becomes necessary, and therefore the data cannot be transferred to the real-time path unit 6. However, if the data is processed by the software in the operation processor 1, the transfer rate is about 4 M pixels/sec; and to use the non-real-time path unit 7 will increase the speed several times.

The processing logic required for the color compensation amounts to 400 k to 500 k gates, however, use of the non-real-time path unit 7 will enable the sufficiently small-scale reconfigurable hardware 72 to support all the functions.

[Modified Example]

Although the usage of the reconfigurable hardware 72 has been described only in relation to the non-real-time path unit 7, there can be a case in which the content of processing and the operating rate meets the rate required by the output device 3. In such a case, the reconfigurable hardware 72 can be used as a resource for the real-time path unit 6.

Figure 6:
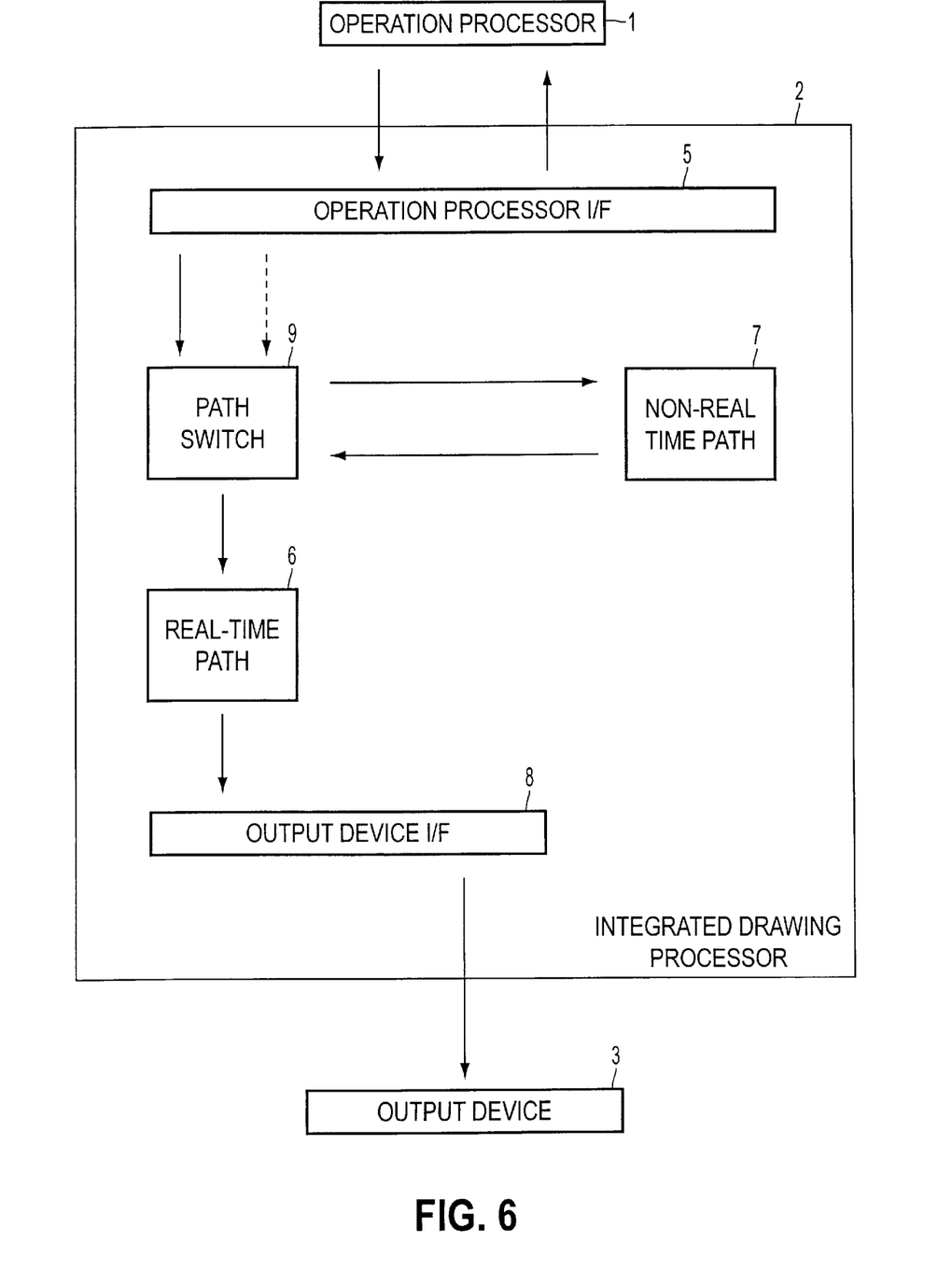
FIG. 6 is a block diagram to illustrate the inner part of the integrated drawing processor with a path switch built in it.

FIG. 6 illustrates a construction in which the reconfigurable hardware 72 is also used as the real-time path unit 6. In FIG. 6, the entire construction is the same as the one in FIG. 2. The integrated drawing processor 2 additionally includes a path switch 9. Signals from the path determining unit 52 in the operation processor 1/F5 as shown in FIG. 4 are directed to the real-time path 6 through the path switch 9. The other parts than the reconfiguration data control unit 71 and the work memory 73 do not go through any changes. A bidirectional bus is provided between the path switch 9 and the non-real-time path unit 7. The processing performed by the reconfigurable hardware 72 is the color compensation processing, for example, which is assumed to employ the matrix system with simpler processing than the table and compensation system. The matrix system is used in a case that does not require very high conversion accuracy, or in a case of conversion of the same color system (for example, conversion from the RGB (standard) system to the Lab system). Use of the matrix system will process the image data by one clock for one pixel, by using the processing logic having 5 k gates; and therefore, the operation processor 1 is able to judge from the database that the operating rate of the reconfigurable hardware 72 is 100 M pixels/sec. In consequence, first the operation processor 1 designates the real-time path unit 6 to the header, and adds an ID information that is not included in the header of the usual non-real-time path unit 7 (as shown in FIG. 5). The ID information determines the processing logic, and the reconfiguration data control unit 71 loads the storage unit with the designated module. On the basis of these conditions, the path determination unit 52 of the operation processor I/F 5 switches the reconfigurable hardware 72 sitting in the non-real-time path unit 7 by using the path switch 9 so that it can also be used in the real-time path unit 6. For this purpose, the data lines of 16 to 32, timing control lines, and communication control lines are switched. The lines from the operation processor I/F 5 come into the path switch 9, and go to the reconfigurable hardware 72 of the non-real-time path unit 7 from the path switch 9. The output of the output buffer 74 is connected to the path switch 9, and inputted to the real-time path unit 6 to be processed therein. From the ID number, the reconfiguration data control unit 71 loads the processing logic of the matrix system. Thereafter, the parameter attached to the header is loaded to enable the reconfigurable hardware 72 to operate. When the reconfigurable hardware 72 becomes possible to operate, the input buffer 51 starts transferring the image data to the reconfigurable hardware 72. The reconfigurable hardware 72 processes the image data at 50 M pixels/sec which is the rate required by the output device 3. The result is connected to the real-time path unit 6 from the output buffer 74, where other processing is conducted, and the result is transferred to the output device I/F 8. The result is displayed and/or printed by the output device 3.

In the description above, the non-real-time path unit 7 and the real-time path unit 6 operate in series, however, they can perform the non-real-time and real-time processing synchronously, if the connection between the operation processor 1 and the integrated drawing processor 2 is capable of simultaneous, bidirectional, high-speed data transfer like IEEE1355. Provision of two systems of the operation processor I/F 5, or expansion of the capacity of the input buffer 51 will enhance the performance in the synchronous operation. The above concludes the description for operations using the integrated drawing processor.

The operation processor 1 processes a block of data, normally a set of documents to be printed or displayed. Here, the minimum unit is one page or one screen. The band processing is started by the minimum unit.

FIG. 12 illustrates the function units to perform the band processing and the mutual operating flow. In FIG. 12, the processing result rearranging unit 201, a band unit dividing unit 202, and a character, graphics and raster synthesizing unit 203, and a path determination unit 204 perform the band processing. The path determination unit 204 checks whether a generated band can be transferred to the real-time path unit 6 by using a database 205; and the processing accompanied with a heavy load is processed by using the non-real-time path unit 7. If the path determination unit 204 determines that the generated band can be transferred to the real-time path unit 6, the path determination unit 204 performs the next band processing. In addition to the case in which the judgment unit 204 outputs after completing the minimum unit, there is a case in which the judgment unit 204 outputs to the output device 3 after thoroughly processing a set of the documents. In the method of thoroughly processing a set of the documents, the foregoing synchronous operation is especially useful.

As described above, in this embodiment, the integrated drawing processor connected to the operation processor 1 is connected directly to the output device. The integrated drawing processor processes the image data, and contains the real-time path unit that directly drives the output device and the non-real-time path unit that performs processing at a lower rate than the rate when the real-time path unit directly drives the output device. The operation processor 1 determines whether the image data are to be transferred to the real-time path unit or to the non-real-time path unit, and attaches necessary header information such as the processing ID to the data. If the non-real time processing is required, the integrated drawing processor loads the processing logic into the reconfigurable hardware in accordance with the processing ID, and sends it back to the operation processor through the output buffer. Thereby, higher speed processing than the software processing by the computer of the operation processor becomes possible. Preparation of many pieces of processing logic that can be operated by the reconfigurable hardware sitting in the non-real-time path unit will enable a lot of image processing to be performed with small-scale hardware at a higher rate than the software processing.

If the reconfigurable hardware sitting in the non-real-time path unit is of a high performance, or if the content of the processing is comparably simple so that the real-time processing is sufficiently possible, the processing can be connected to the real-time path by using the path switch to be processed therein. Therefore, still speedier processing becomes possible without using the non-real-time path unit, making no difference in use of small-scale hardware.

When the address of transfer designation to which the processing result of the non-real-time path is transferred is known, then the operation processor is designated as the transfer destination, and the integrated drawing processor becomes capable of hardware installation by a card-size memory, without requiring a large memory.

Even though the characteristic of the output device to be connected changes, all that is needed is to newly download the processing logic, or to modify the processing parameters. When the performance changes, the integrated drawing device is able to comply with a wide variety of fields by modifying the database and utilizing the real-time path unit. Further, being integrated hardware, the integrated drawing device does not need a plurality of boards, and it can be composed of inexpensively.

According to the present invention, the integrated drawing processor is able to perform a lot of image processing with small-scale hardware at a higher rate than software processing, by preparing many processing pieces of logic that can be operated by the reconfigurable hardware constituting the non-real-time path unit.

The invention being thus described, it will be obvious that the same may be varied in many ways. Such variation is not to be regarded as deviation from the spirit and scope of the present invention, and all such modifications as would be obvious to one skilled in the art are intended to be included within the scope of the following claims.

What is claimed is:

1. A drawing processor that includes hardware whose function is determined by connections of internal elements, processes inputted image data, and drives an output device, comprising:

a real-time path unit that processes synchronously with an image processing rate of said output device;

a non-real-time path unit that processes at a lower rate than said synchronized rate; and a path determination unit that determines whether said inputted image data is transferred to said real-time path unit or to said non-real-time path unit, on the basis of the content of said inputted image data, wherein said non-real-time path unit at least contains rewritable hardware that reconfigures processing functions.

2. The drawing processor as claimed in claim 1, wherein said rewritable hardware that reconfigures processing functions comprises at least a FPGA (Field Programmable Gate Array) and a memory.

3. The drawing processor as claimed in claim 2, wherein the body of the drawing processor is connected to an operation processor, and a processing result of said non-real-time path unit is transferred on the basis of transfer destination address information that is contained in the data transferred to said non-real-time path unit.

4. The drawing processor as claimed in claim 3, wherein information whereby processing is selected and a parameter required for the processing are attached to the data to be transferred to said non-real-time path unit.

5. The drawing processor as claimed in claim 3, wherein the transfer destination address to which the processing result of said non-real-time path unit is transferred is an address of a storage unit in said operation processor.

6. The drawing processor as claimed in claim 5, wherein said non-real-time path unit contains a reconfiguration data control unit, and said reconfiguration data control unit loads designated processing logic and a transferred parameter.

7. The drawing processor as claimed in claim 6, wherein said rewritable hardware that reconfigures processing functions alternatively switches the output destination between the non-real-time path unit and the real-time path unit.

8. The drawing processor as claimed in claim 7, wherein the drawing processor is made up in a card size.

9. The drawing processor as claimed in claim 8, wherein said operation processor contains a database to present a performance of the body of the drawing processor, and the path unit to which the data is transferred is discriminated on the basis of information of the database.

10. The drawing processor as claimed in claim 9, wherein switching between said real-time path unit and non-real-time path unit to which the data is transferred is executed by a specific unit of the image data.

11. An image processor comprising:

an operation processor that generates image data;

a drawing processor that includes hardware whose function is determined by connections of internal elements and processes said image data, comprising a real-time path unit that processes synchronously with a required image processing rate, a non-real-time path unit that processes at a lower rate than the synchronized rate, and a path determination unit that determines whether said inputted image data is transferred to said real-time path unit or to said non-real-time path unit, on the basis of the content of the inputted image data;

and an output device that is driven by a processing result of said drawing processor.

* * * * *